United States Patent [19]

Weiner

[11] Patent Number: 5,517,407
[45] Date of Patent: May 14, 1996

[54] DEVICE FOR INCLUDING ENHANCING INFORMATION WITH PRINTED INFORMATION AND METHOD FOR ELECTRONIC SEARCHING THEREOF

[75] Inventor: Michael L. Weiner, Webster, N.Y.

[73] Assignee: In-Dex, Webster, N.Y.

[21] Appl. No.: 269,920

[22] Filed: Jun. 30, 1994

[51] Int. Cl.$^6$ ............................ G06F 17/30; G06F 17/20
[52] U.S. Cl. ................. 364/419.01; 364/419.19
[58] Field of Search .......................... 235/380, 375; 364/419.07, 419.13, 419.19; 283/83, 76; 434/309, 311, 335

[56] References Cited

U.S. PATENT DOCUMENTS

| | | | |
|---|---|---|---|
| 4,358,824 | 11/1982 | Glick et al. | 364/419.19 |
| 5,153,831 | 10/1992 | Yianilos | 364/419.13 |
| 5,331,554 | 7/1994 | Graham | 364/419.07 X |
| 5,365,434 | 11/1994 | Figliuzzi | 364/419.13 X |

FOREIGN PATENT DOCUMENTS 0061391 3/1988 Japan ..................... 364/419.07

*Primary Examiner*—Donald T. Hajec
*Assistant Examiner*—Thien Minh Le
*Attorney, Agent, or Firm*—Cumpston & Shaw

[57] ABSTRACT

An enhanced book includes, in addition to printed material, enhancing material such as additional text, graphics and sounds, the nature of which is limited solely by the ability to store the additional information in digital format, stored in a memory device attached to the book, together with a connector for allowing the enhanced book to be connected to an external computing device for accessing and presenting the enhanced information to the reader.

36 Claims, 10 Drawing Sheets

DEVICE FOR INCLUDING ENHANCING INFORMATION WITH PRINTED INFORMATION AND METHOD FOR ELECTRONIC SEARCHING THEREOF

TECHNICAL FIELD

The present invention relates generally to printed information such as that included in books and other printed publications. More particularly, the present invention relates to providing enhancing information in a non-printed format, preferably a compressed digital format, that is accessible to the reader of the printed information. The enhancing information may be displayed as additional text, sounds, graphics (including moving pictures) or combinations thereof. The enhancing information may relate to retrieval of information included within printed publications by reader use of an index of such information. More specifically, the enhancing information relate to electronically searchable indices for printed publications.

The enhancing information is accessible to the user by attaching a reader, which is preferably a general or special purpose computing device that includes some form of input/output (I/O) connection, not necessarily designed for connecting to the book of the present invention, together with an adapter for connecting the computing device to the book.

As used in this application, we intend that the term book includes not only conventional books, but other forms of printed information that could be read directly by users such as maps, newspapers, and other unbound publications that include printed information. Forms of printing such as Braille embossing are also covered.

BACKGROUND ART

Semi-conductor devices have been used to enhance printed publications by adding sound. For example, greeting cards have been made with memory chips embedded in the cards for directly producing sounds by means of a small transducer (speaker) also embedded in the card.

Nippon Gakki Co. Ltd. has provided music books under the trademark Yamaha Clavinova ROM Music Book, that include a semi conductor ROM attached to a book of sheet music and including a connector for plugging into a special music stand of an electronic keyboard instrument. The combination plays a fully orchestrated accompaniment to the scores in the book. Information stored in the ROM illuminates guide lamps above the keyboard to show the user which notes to play. The accompaniment is paced by the keyboard, that is the accompaniment waits until the proper key is pressed before proceeding.

Readers have long sought to enhance the usefulness of printed publications by being able to quickly and economically locate information of specific interest contained therein. Over the centuries the printed index, and, to a lesser extent, the table of contents, have been found to be the most, if not the only, practical mechanism for fulfilling this need. Printed indices have been used even where there was an interest in reviewing the content of a book without having to remove the book from its shelf, as shown in U.S. Pat. No. 2,465,616 where a removable index was printed on a strip housed within a book's binding. Today, readers expect and demand, and publishers routinely provide, an index and table of contents fixedly bound in the vast majority of all printed non-fiction works.

However, printed indices have several significant limitations. Perhaps most deleterious of these is that only a very small number of the words used in the work may be included in the index because of space and cost restrictions. This has resulted in indices of widely varying quality, dependent on the editorial skill of the indexer(s). Moreover, this has posed challenges for readers as they must deftly surmise those words chosen by the indexer to convey the location of the information of interest to the reader. Indeed, most likely every reader has, from time to time, been frustrated by an inability to locate information of interest due to the nature of a work's index.

Electronic indices have overcome such limitations. In an electronic index all words in a work may be indexed because the index may be stored in electronic memory that is compact and inexpensive. Where all words are indexed, the quality of the index is not dependent upon an indexer's editorial skill and the reader need not possess mystical powers to divine the word or words selected by the indexer to indicate the location of the information of interest. Additionally, electronic indices allow utilization of more sophisticated searching methodologies, such as those dependent upon Boolean logic.

Unfortunately, electronic indices heretofore available possess their own shortcomings, the most substantial of which has been the essential requirement that they be accessed on separate computers and distributed on media apart from the printed work, such as CD-ROM or floppy disks. At the very least this has meant appreciable inconvenience and added costs for both the publisher and the reader, and perhaps has diminished the usefulness of electronic indices sufficiently to discourage interest therein. Given the wide variety of computer hardware and software that potential readers might use from which to access electronic indices, publishers wishing to distribute such aids have been left with conundrum of supporting numerous disparate computer platforms at great expense or excluding a significant portion of its potential market.

In some measure to surmount these limitations, entire printed works have been made available electronically in what amounts to small, usually hand held computers known as electronic books. While electronic books allow incorporation of electronic indices and/or full text searching, they do not enhance printed publications; they are substitutions subject to all limitations of small computers, including poor display quality and costs.

General and special purpose personal computer devices are becoming increasingly popular as their cost falls and their utility increases. Many people own or have access to one or more computing devices, such as a personal desk top computer, a lap top or other portable computer, hand held computer or personal digital assistant (PDA), electronic note book/calendar/address or telephone directory, which is actually a general purpose computer with specialized software for providing a particular function, and the like. Most of these personal computer products include some form of I/O. Serial and parallel communication ports are common. Infrared and other wireless connections are becoming more common, and other forms of wired or wireless communications will appear as the technologies for implementing them become available.

Some of the devices just mentioned have a capability for storing and displaying text, graphics, sounds and the like, either in memory within the computer, or by means of external memory, such as magnetic memory, optical memory, and the like. While useful, many if not most readers prefer to obtain information in printed form from books. There are many reasons for this, some personal to individual readers, and some technical, such as the quality of the display of text, graphics and images in computers presently available. For whatever reason, the vast majority of text, image and graphics is still provided to readers in printed form.

The printed format has, in addition to the advantages that make it popular among readers, serious limitations. The amount of information that can be provided in a book is directly related to the size of the book. Although books are conceptually random access devices, in that a reader may proceed immediately to any page, there is no convenient way to implement hyper text concepts in a book. Except for indices, tables of contents, and the like, there is no convenient way for the reader of a book to proceed immediately from general information on a topic to more specific information and back without quickly losing one's place.

SUMMARY OF THE INVENTION

There is a need for enhanced books that overcome one or more of these problems. In accordance with this invention, an enhanced book includes, in addition to printed material, enhancing material such as additional text, graphics and sounds, the nature of which is limited solely by the ability to store the additional information in digital format, stored in a memory device attached to the book, together with a connector for allowing the enhanced book to be connected to an external computing device for accessing and presenting the enhanced information to the reader.

The nature of the material stored in the digital memory may vary widely. In a rudimentary aspect of this invention, the text of the book itself, together with indices and pointers for locating information in the book are provided. This aspect of the invention greatly improves upon printed indices, tables of contents and the like by allowing the full text of the book to be stored, and fully indexed, so that the entire book may be searched in accordance with known searching methodologies, such as Boolean searches, natural language searches and the like, all of which can be implemented in the computing device attached to the book, but using indices and pointers to the text of the book stored in the memory attached to the book. Beyond the simple full text indexing just described, the enhancing information can include incremental information not presented in printed form in the book. Such information includes, for example, embedded contextual definitions, stored sounds that relate to the text of the book or to the subject of a graphic element in the book, hypertext links for allowing the reader to move within the book in a more flexible manner than provided by printed indices or by tables of contents, and any other information related to the printed information in the book.

By using a memory device to which information can be written as well as read, the information in the memory of the book may be updated with new information as it becomes available. In this way, books such as encyclopedias or law books, to which incremental information may be added from time to time, but which are otherwise still useful, can be kept up to date more economically than with present books. The memory can also store information added by the reader, such as notes, electronic bookmarks, and the like.

By incorporating a wireless receiver, such as an infrared receiver or more preferably a longer range radio frequency receiver, either in the book itself or in a computer attached to the book, information stored in the memory attached to the book can be updated remotely.

It is an important aspect of this invention that the information that is stored in the memory device in the book be arranged in a manner that does not limit the type of external computing device that can be used to access it. There is a multiplicity of computing devices available, and both the number and types are increasing. In accordance with this invention, the information stored in the memory in the book is arranged in a consistent predetermined manner from book to book, regardless of the type of book and the type of memory, so that the information can be accessed from virtually any computing device with an I/O connection by means of a cable and an interface adapter matched to the computing device.

In preparing the information stored in the memory in the book, the information is initially selected and prepared by the book publisher. The information may include the printed information in the book, and/or additional information related to the information in the book, and information needed to access the basis information and additional information, such as pointers, indices and the like used by the computing device.

All of this information is then compressed into a binary form and stored in the memory in the book. The memory is attached to a physical connector on the book, or to another interface device, such as a infrared transceiver, RF transceiver, induction coupled device or the like.

To access the information in the memory on the book, the user connects an external computing device to the memory in the book with an adapter. The form of the adapter will depend upon the type of computing device to which the book is connected, and may be a simple cable, a cable with an interface device for adapting the connections on the book to the I/O port on the computing device, or a radio/electrical/optical adapter for coupling the computing device to the book.

The invention allows the functions of the book publisher and the purchaser to be effectively isolated, thus expanding both the audience for each book and the books available to each reader, that is, the editor of the publication in which the invention will be used needs only to predetermine the attributes of the information that will be stored in the device, and link the augmenting information to the pages, pictures, tables, words and the like of the printed book in ways that are limited only by editorial considerations to enable to book to be used most effectively. The purchaser of the book must acquire the appropriate interconnecting cable or the like and the necessary software for her computer. The interconnecting hardware and software will be common to the user's computer, rather than the book. In this way, virtually any computer can access the information in the memory in virtually any book.

The nature of the connecting device may vary widely depending upon the nature of the computing device connected to the book. In accordance with one aspect of the invention, where the computing device is particularly limited, or the connection between the computing device is long, the connecting device may include a separate microprocessor, drivers and the like, additional memory and other components necessary to retrieve information from the book and deliver it in usable form to the computing device.

This allows the memory in the book to be both as simple as possible to reduce the cost thereof as much as possible, and also to be standardized, so that there is no need for the book publisher to conform the information stored in the memory in the book to the limitations of a particular computer from which the information will be accessed.

To keep the cost of the enhanced book as low as possible, consistent with mass publishing, the memory in the book should include as little hardware as possible, preferably memory only, and a connector. In accordance with one aspect of the invention, a memory chip such as a read only memory, random access memory, flash memory or the like includes an address bus, a data bus and one or more control lines, such as a power connection, a chip select line and the like. These connections are available at a multi pin connector mounted on the book.

A book interface adapter includes a mating multi pin connector connected to a micro processor having an external or internal clock. In this arrangement, the operating software for the microprocessor is stored on the memory in the book, rather than in the book interface device. This keeps the interface device as inexpensive as possible, and there is usually considerable memory available within the book memory device. The microprocessor in the book interface converts the parallel structure of the memory in the book to a bi-directional serial data stream. A cable connects the book interface adapter to a serial I/O port on the external computing device. Where the connecting cable is long, additional line drivers may be provided at the computer end of the cable.

The same arrangement allows the book to be connected to other computers using different I/O schemes. For example, to connect the book to a computer having a PCMCIA interface, the arrangement of the memory in the book and the book interface adapter are the same. The connecting cable terminates, at the external computer, and in a PCMCIA compatible card that includes a serial interface device, such as a universal asynchronous receiver transmitter (UART) connected to a 68 pin PCMCIA connector, and a read only device that includes firm ware for the external computing device to allow it to access data stored in the memory in the book.

PREFERRED EMBODIMENT FOR CARRYING OUT THE INVENTION

Figure 1:
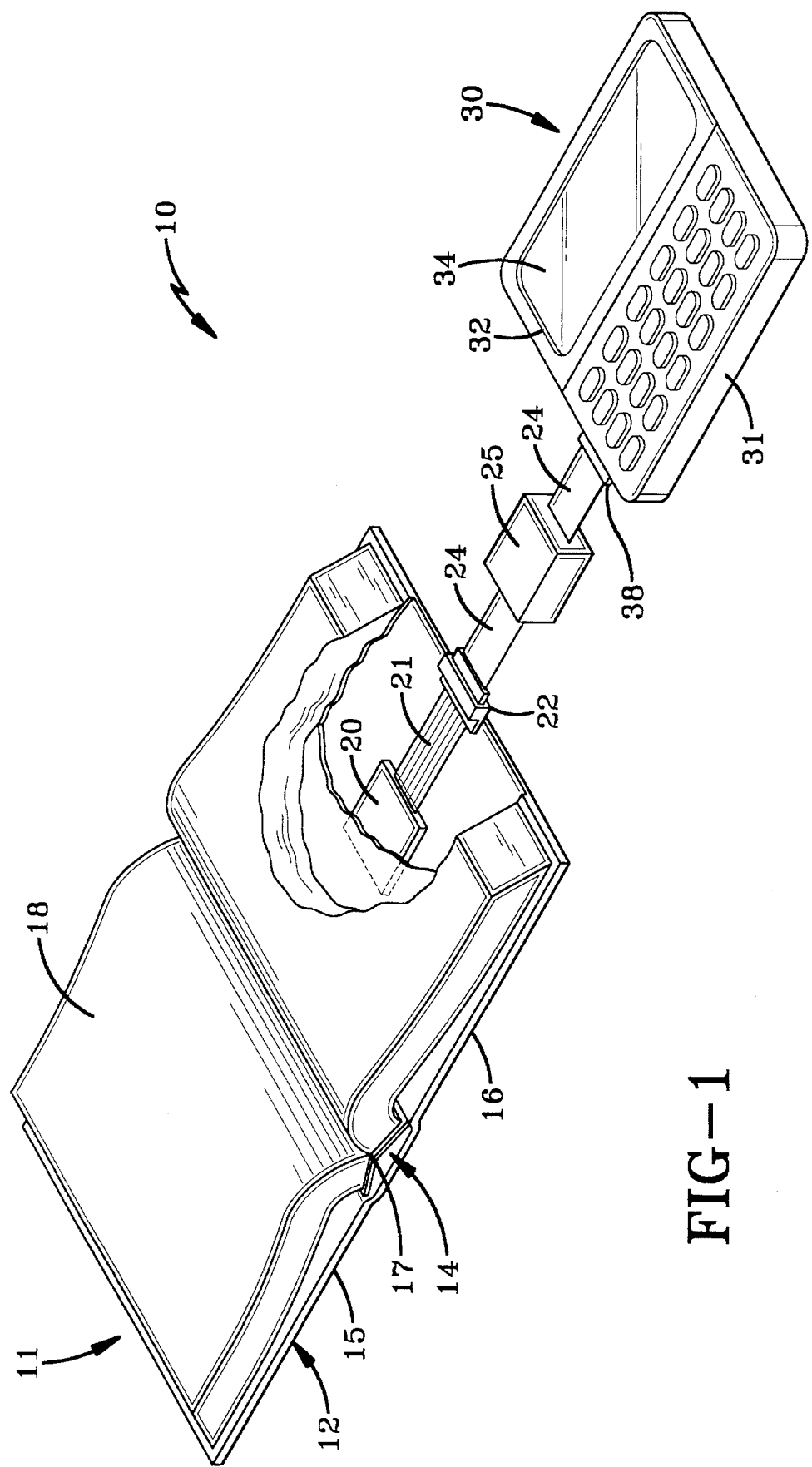
FIG. 1 is a perspective view of a printed work such as a book in which an integrated circuit memory chip within which is stored an electronic index and optionally other information related to printed work is mounted in the back cover of the book in accordance with the concept of the present invention, and is connected to a suitable connector for interconnection through an interface cable and a communication interface to a hand held computer access unit.
Figure 2:
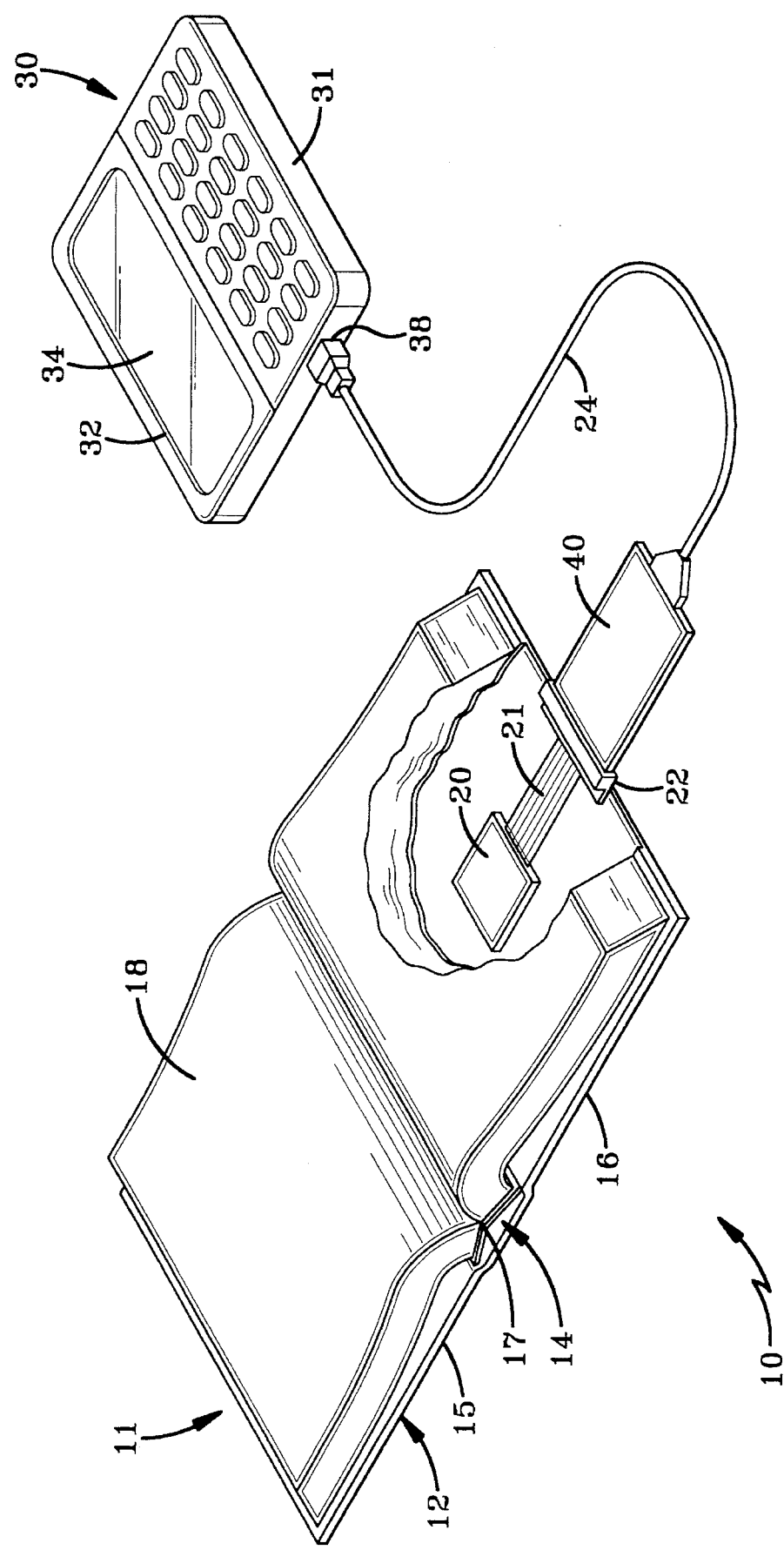
FIG. 2 is a perspective view of a book and stored memory chip, as shown in FIG. 1, in which the necessary communication interface is included within an adapter such as a PCMCIA card that is plugged into a suitable mating connector and a cable electrically interconnects the PCMCIA card to the hand held computer access unit.

FIG. 1 is a perspective view of an exemplary device in accordance with the concept of the present invention, generally indicated by the numeral 10, including a printed work 11, such as a book 12 having binding 14, a front cover 15, a back cover 16, a spine 17 and a plurality of pages 18. Device 10 shown in FIG. 1 includes an exemplary integrated circuit memory chip 20 within which is stored an electronic index and optionally other information related to printed work 11, and is securely mounted in back cover 16. Chip 20 is electrically connected by a ribbon cable 21 to a removable connector 22 for interconnection through an interface cable 24 and communication interface 25 to an access unit 30 such as a hand held computer 31 having a user interface 32 such as a display 34.

Printed work 11 may be a work of any configuration in which information is presented for direct human perception. Thus, for example, in addition to a cloth- (or other hard-) bound, or soft-bound book, work 11 may be a magazine, or other paper based media sufficient to carry an electronic memory device as memory chip 17 and allow its operable interconnect to access unit 30. Moreover, while visually perceptible works predominate, device 10 will operate successfully with works 11 that are directly perceived by people using other senses, such as the tactile sense used by a Braille reader or the auditory sense used by a person learning to read. Of course, as described more fully below, the exact nature of the physical configuration of memory chip 17, access unit 30 and their interconnection will differ dependent upon the nature of work 11.

Integrated circuit memory chip 20 may be any electronic memory device having sufficient capacity to store and retain the desired information in an electronic form and capable of secure mounting within printed work 11. Memory chip 20 may be mounted within printed work 11 at any location and in any manner where memory chip 20 may be acceptably protected from damage due to handling of printed work 11 and sufficient for connection to a suitable channel for intercommunication to access unit 30. One form for such device suitable for book 12 and most other works 11 may be a non-volatile integrated circuit memory chip, or array of chips, surface mounted to a printed circuit board. The surface area of the printed circuit board would facilitate its secure embedding sandwiched centrally within back cover 16 as depicted in FIG. 1 or elsewhere such as in the spine 17 or front cover 15, its connection to a suitable channel for intercommunication to access unit 30 such as ribbon cable 21, and its protection of memory chip 20 by distribution of any force applied to book 12 in the vicinity of memory chip 20.

Cable 21 may be any arrangement of conductors suitable for electrically interconnecting memory chip 20 and connector 22, but is preferably as flat as possible, such as a foil pattern on a printed circuit board or a ribbon cable.

Connector 22 may be any device, such as a conventional edge or block connector, suitable for secure mounting to printed work 11 and establishing an adequate electrical connection with an external channel for intercommunication to access unit 30 like interface cable 24, but is preferably of the smallest possible profile, such as that specified by the Personal Computer Memory Card International Association (PCMCIA) of Sunnyvale, Calif. Connector 22 will preferably for most printed works and as illustrated in FIG. 1 permit a removable interconnection to the external channel for interconnection, but may provide a fixed connection for certain access unit 30 configurations noted below. For example, access unit 30 may be folded or tucked inside book in front of the rear cover.

Figure 3:
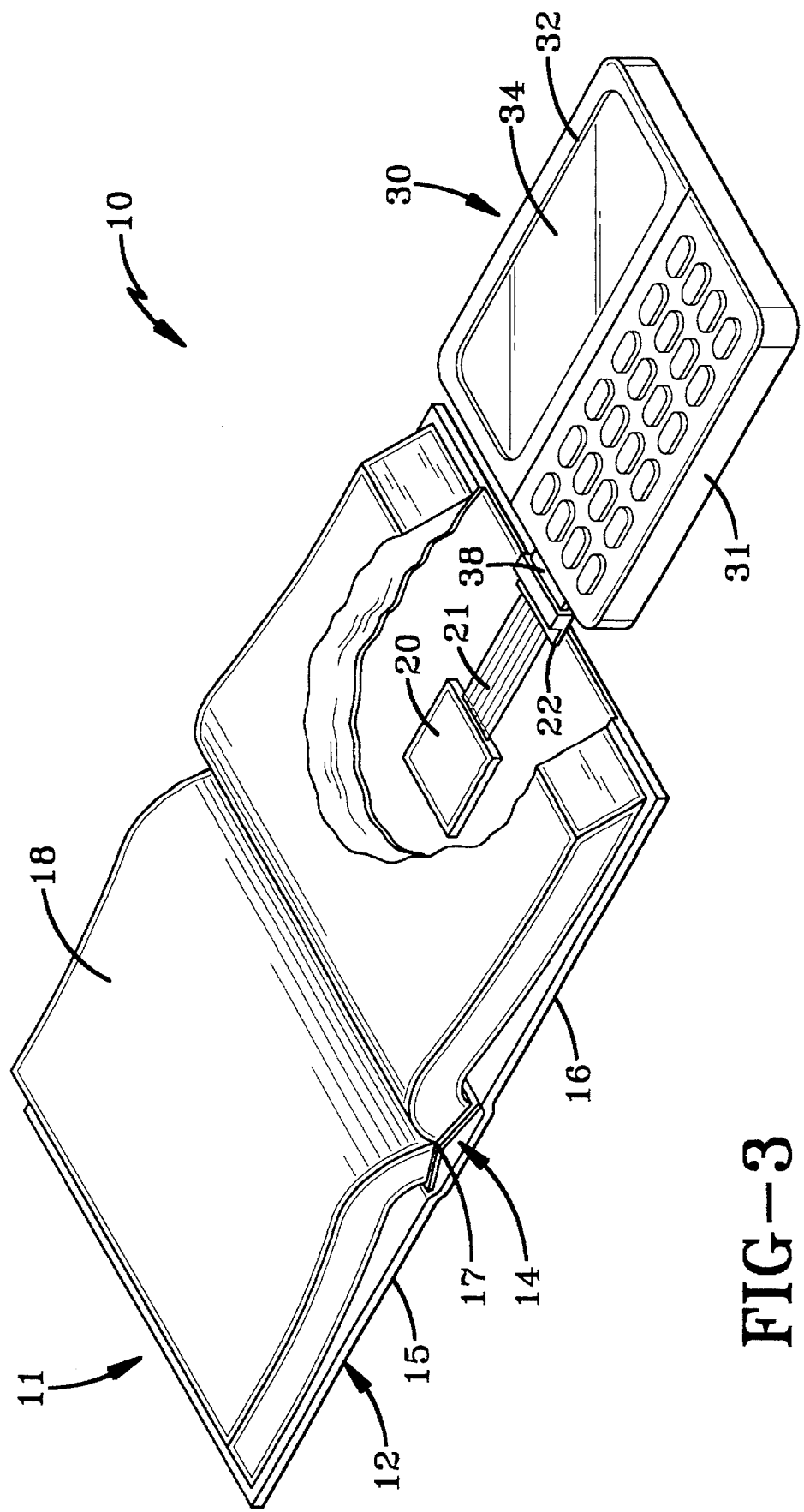
FIG. 3 is a perspective view of a book, as shown in FIG. 1, in which the hand held computer access unit is plugged directly into the connector.
Figure 4:
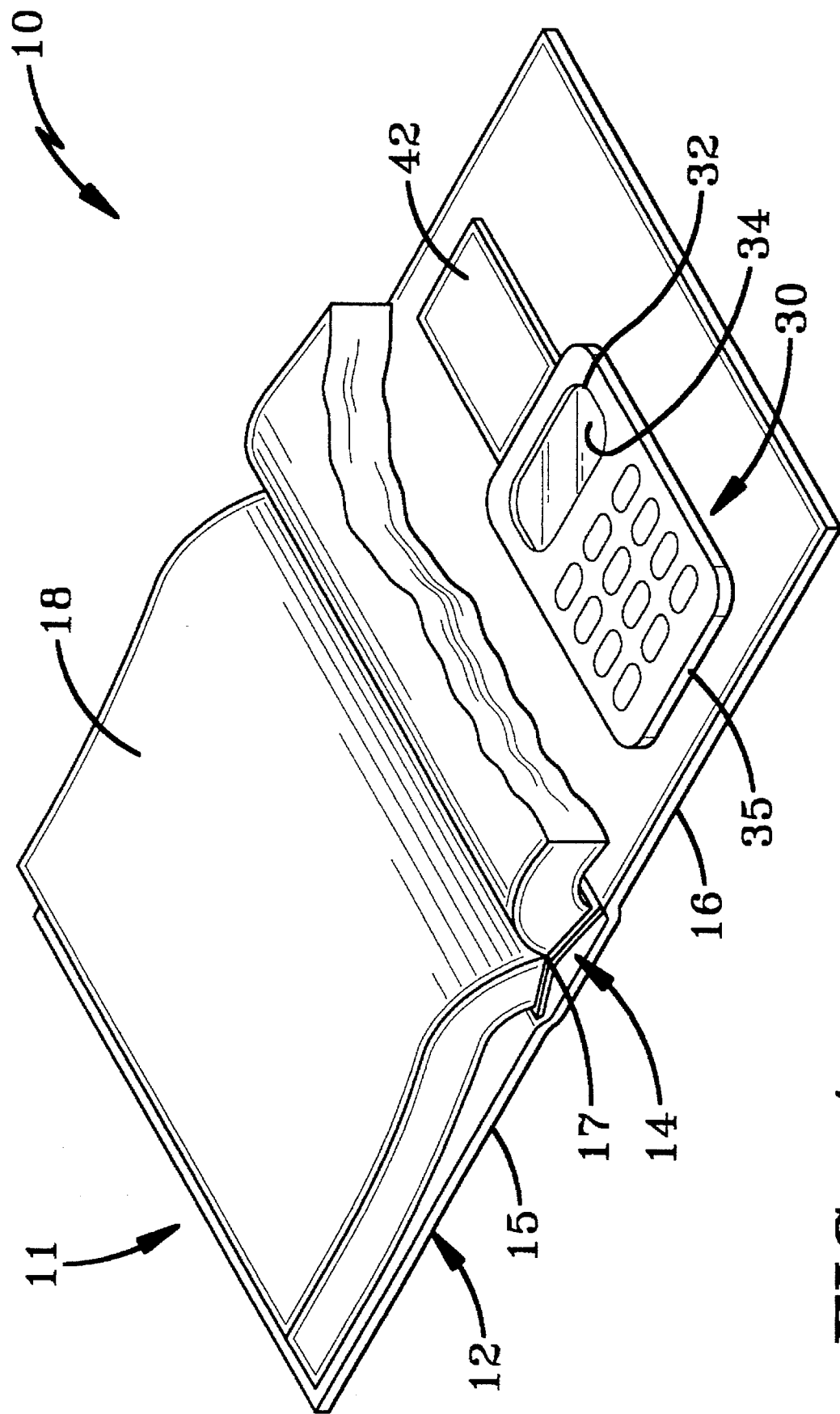
FIG. 4 is a perspective view of a book, as shown in FIG. 1, in which the hand held computer access unit is mounted in the cover of the book together with the chip and electrically connected directly thereto.
Figure 8:
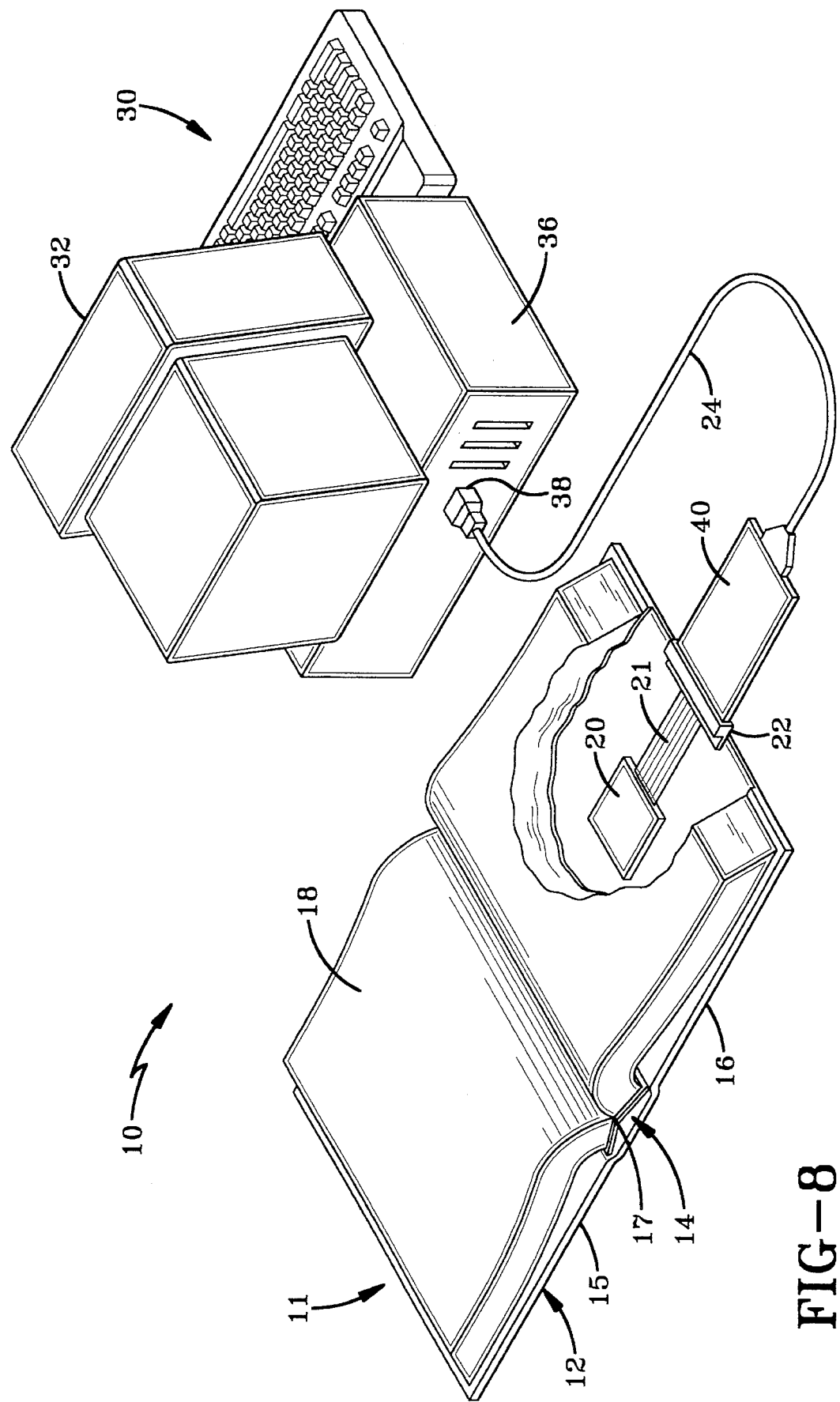
FIG. 8 is a perspective view of a book, as shown in FIG. 2, in which the cable from the necessary communication interface is electrically connected to a desktop personal computer through suitable means such as a conventional serial port.
Figure 9:
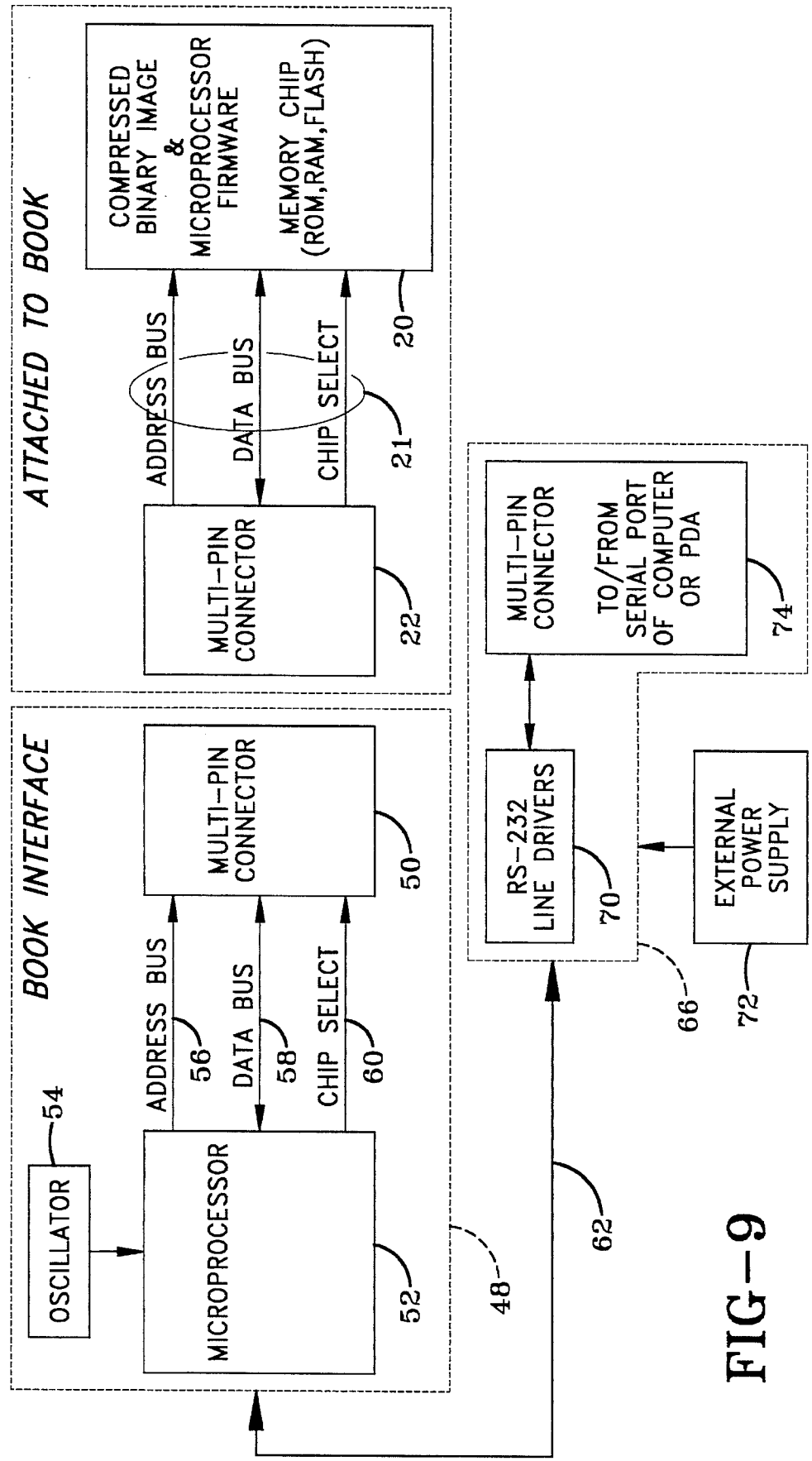
FIGS. 9 and 10 are block diagrams of embodiments of this invention designed for use with computers having a serial I/O port and a PCMCIA port respectively.

Access unit 30 may be any device capable of accessing the information content stored within memory chip 20, including such processor-based devices as the hand held computer 31 shown in FIGS. 1, 2, 3, 5 and 6, the personal organizer 35 depicted in FIG. 4, a personal digital assistant (PDA), and a personal computer (PC) of any size, like the desktop PC 36 illustrated in FIGS. 8 and 9. Access unit 30 may be operated directly by the user or indirectly by another processor-based device for remote access to the information content of memory chip 20. When access unit 30 is operated directly by a user, it should include the user interface 32 noted above to permit either visual information conveyance to the user (in the case of the display 34 noted above) or audible information conveyance (useful by blind users or in an application where visual interaction is impeded). An access unit directly operated by a user should further include at least one input mechanism like a keyboard 37, pen or other tactile device or voice-actuated receiver to allow entry of queries and choices.

Cable 24 electrically connects the conductors present at connector 22 with suitable input conductors such as those present at a communication port 38 configured, for example, in conventional RS-232 serial or parallel fashion. The skilled artisan is familiar with digital electronic communication, and where desired may furnish communication interface 25 to permit and facilitate such intercommunication between memory chip 20 and access unit 30. If desired, communication interface 25 may be included within a PCMCIA card 40 that engages both a PCMCIA compatible connector 22 and cable 24, as pictured in FIGS. 2 and 8.

In some applications, particularly where access unit 30 is small and lightweight, it may be found acceptable or desirable to incorporate the necessary communications electronics and software into access unit 30 and/or printed work 11, allowing a direct interconnection between communication port 38 and connector 22, as presented in FIG. 3. Alternatively, as shown in FIG. 4, it may be possible and desirable to incorporate a credit card sized access unit 30 into printed work 11 and electrically interconnect a compatible memory chip 20 or PCMCIA flash memory card 42 directly, or through a suitable cable (not shown), thereto.

Figure 5:
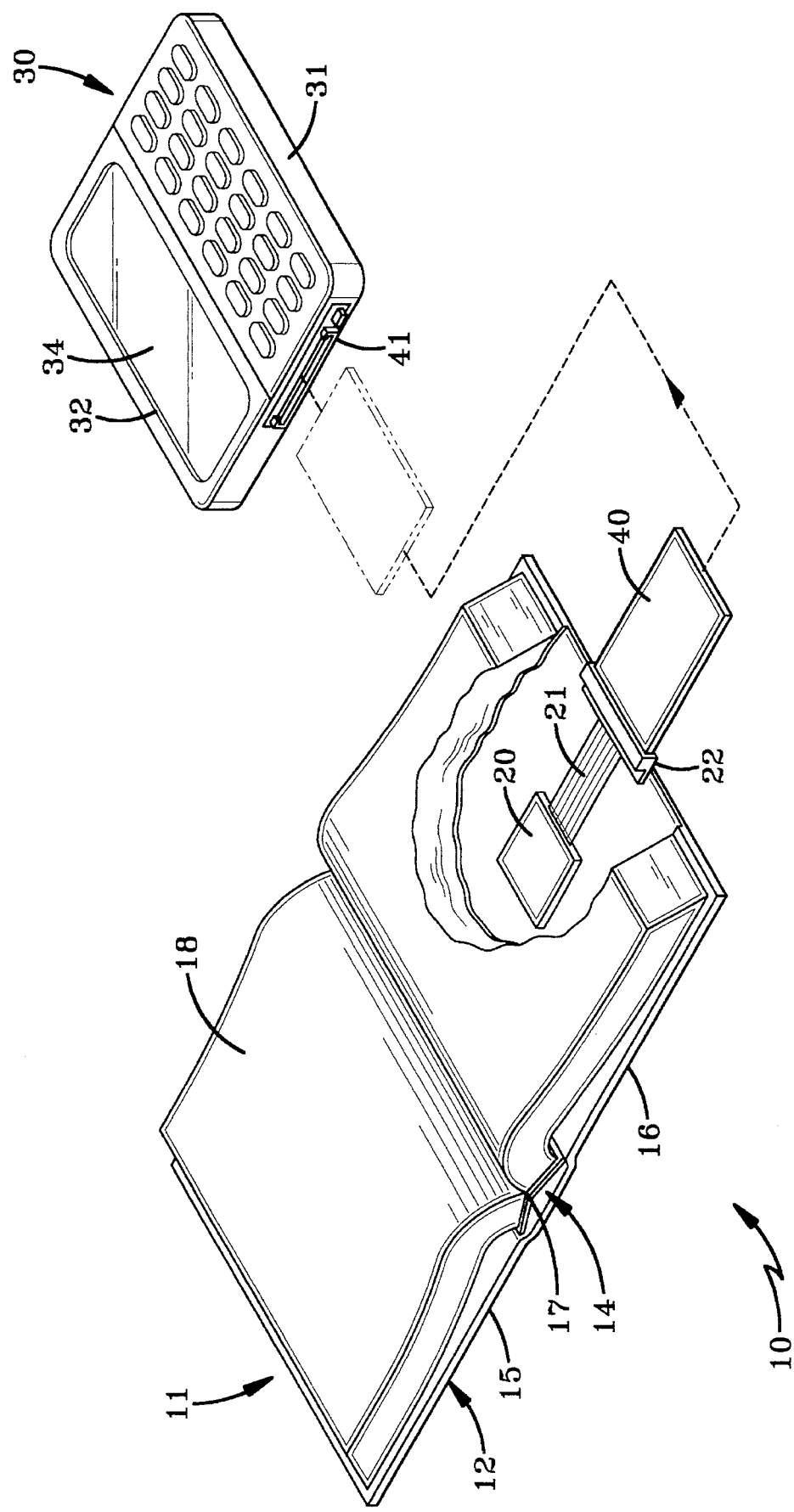
FIG. 5 is a perspective view of a book, as shown in FIG. 2, in which the necessary communication interface is included within an adapter card such as a PCMCIA card that is shown plugged into the edge connector. However, in place of a cable for electrically interconnecting the communication interface to the personal computer access unit, the personal computer access unit includes a PCMCIA slot for receiving the PCMCIA card onto which is placed at least selected contents of the integrated circuit memory chip.
Figure 6:
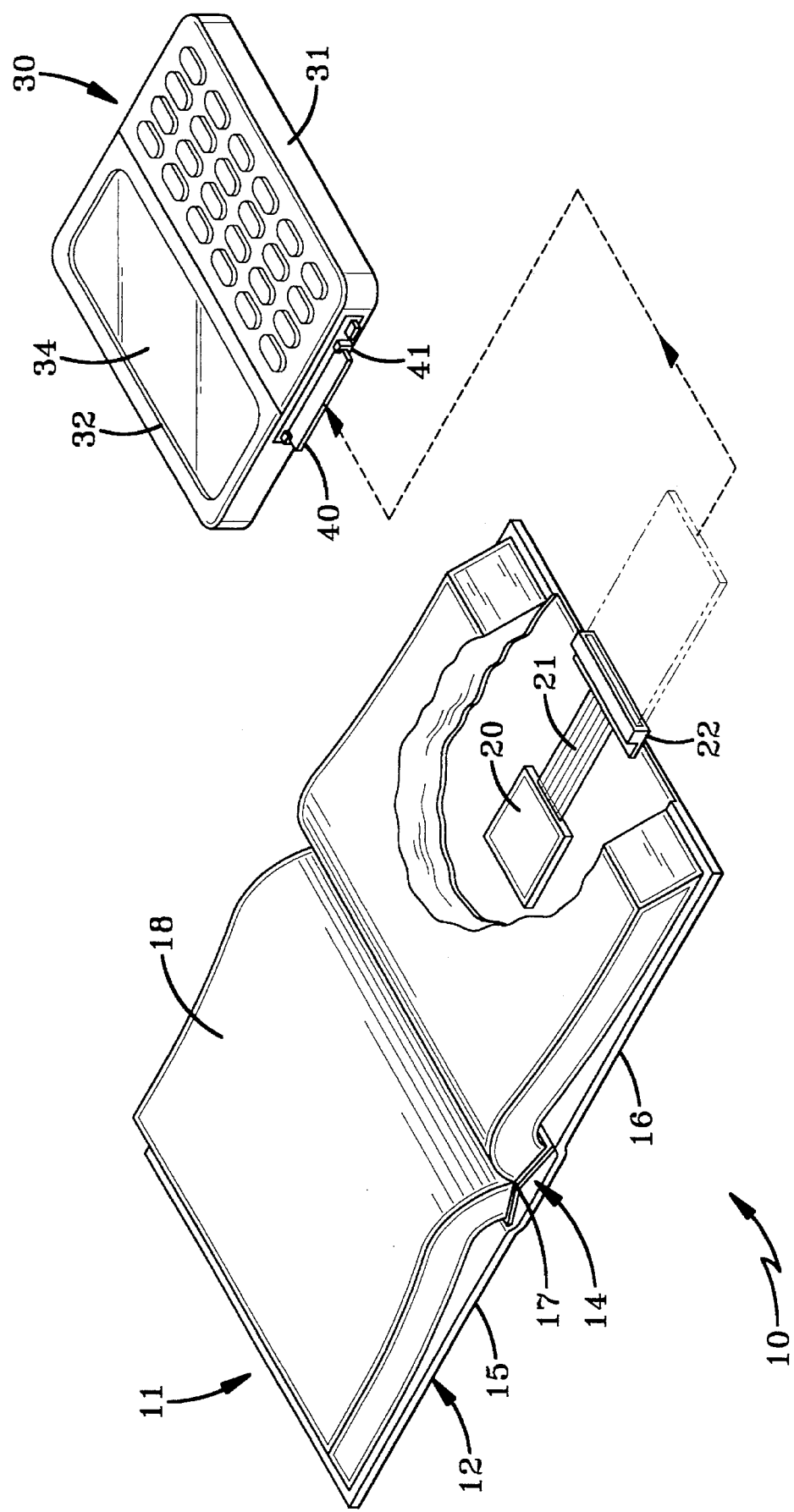
FIG. 6 is a perspective view of a book, as shown in FIG. 5, after the PCMCIA card has been removed from the edge connector and is subsequently inserted into the corresponding card slot in the personal computer access unit.

As will be discussed further hereinafter, selected portions of the contents of memory chip 20 or its entire contents may be advantageously transferred to access unit 30. As seen in FIG. 5, PCMCIA card 40 including compatible communication software and adequate memory therein, may be inserted into connector 22, download all or a select portion of the contents of memory chip 20, disengaged from connector 22 and plugged into a PCMCIA compatible socket 41 in access unit 30 (as shown in FIG. 6), and the downloaded contents of memory chip 20 transferred to access unit 30. Queries to download selected contents of memory chip 20 may be entered into access unit 30, transferred to PCMCIA card 40 and, after PCMCIA card 40 is plugged into connector 22, executed on the contents of memory chip 20. PCMCIA card 40 may be returned to access unit 30 and the query results may be uploaded as explained above.

Figure 7:
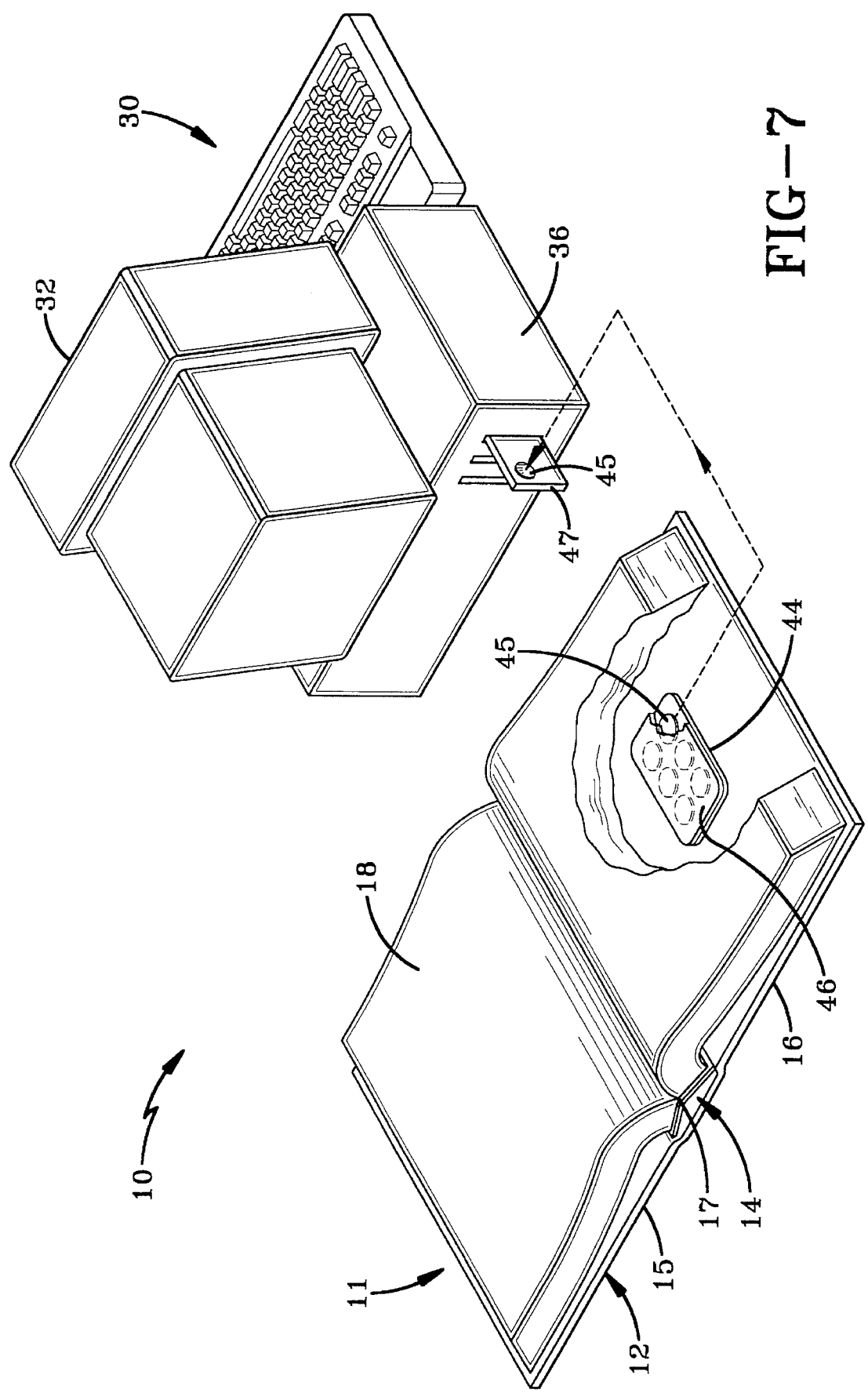
FIG. 7 is a perspective view of a book, as shown in FIG. 1, in which the integrated circuit memory chip includes a plurality of tokens, and the personal computer access unit, here shown as a desktop personal computer, is electrically connected by suitable means to receive one or more of the plurality of tokens to effect information transfer to the desktop personal computer.

Integrated circuit memory chip 20 may be chosen and configured in such manner that no conductor will be necessary for electrical connection to an access unit 30. One configuration that would allow such wireless transfer of the content of memory chip 20 is shown in FIG. 7 and employs an integrated circuit (IC) card 44 carrying a plurality of removable IC modules (also called tokens) 45 secured by a removable cover 46 accessible through the portion of printed work 11 carrying IC card 44. IC card 45 is described in U.S. Pat. No. 5,049,728 hereby incorporated by reference. Each token 45 may store information of interest in whatever preselected division of subject matter is desired. Selected or the complete contents of IC card 44 may be accessed by access unit 30 by opening removable cover 46, withdrawal of the token(s) 45 of interest, and its/their insertion into a corresponding IC card 47 having a connector suitable for engagement with a communication port of access device 30.

Wireless transfer of the content of memory chip 20 may also be accomplished by incorporating a suitable wireless signal transmitter within printed work 11. A variety wireless signal transmitter technologies may be employed, including those operating at radio, infrared or ultrasonic frequencies, to name but a few.

Figure 10:
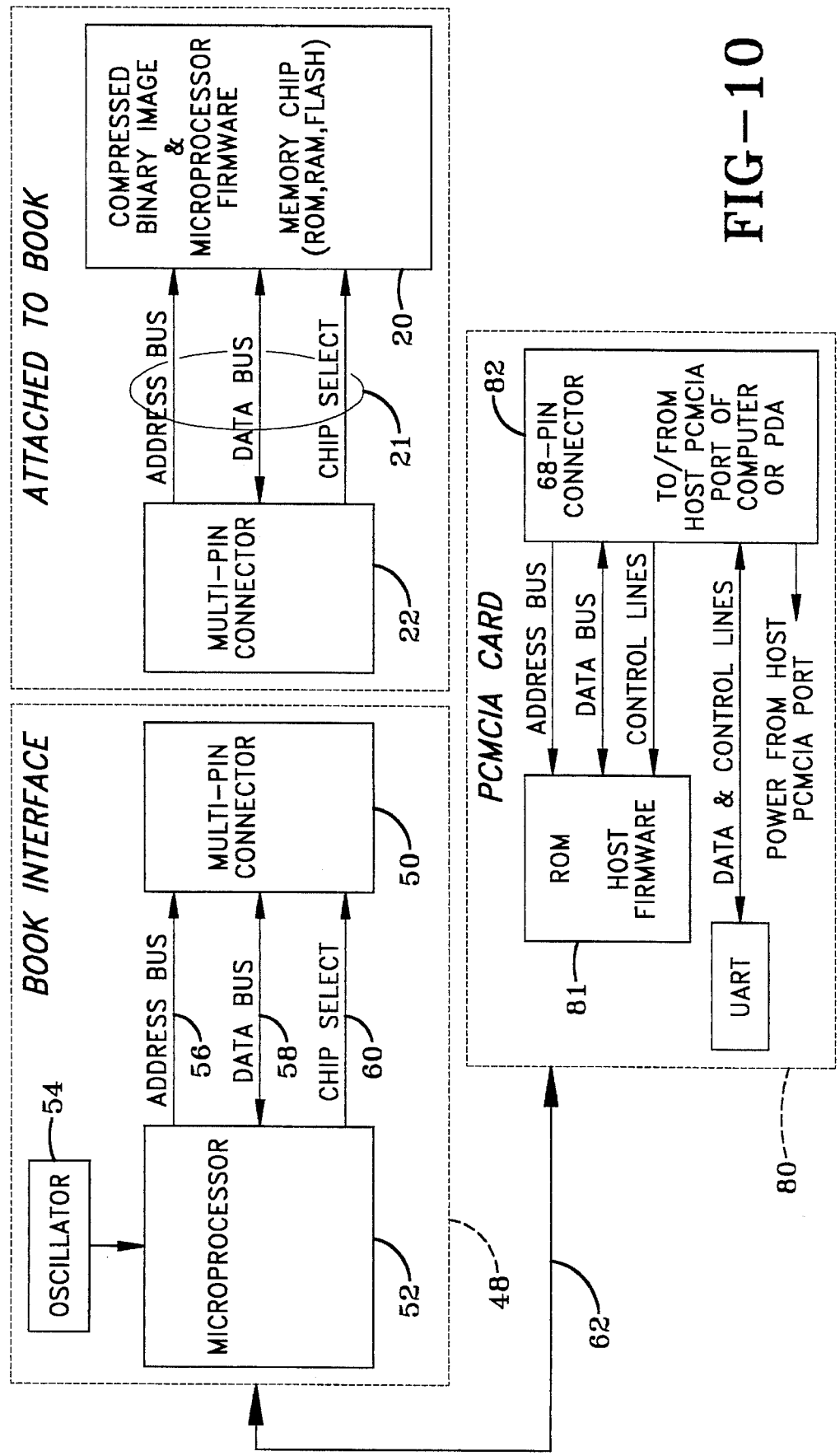

FIGS. 9 and 10 are block diagrams of embodiments of this invention designed for use with computers having a serial I/O port and a PCMCIA port respectively. As already described, the memory 20 attached to a book is preferably the same in each case, that is the arrangement is the same, it does not depend upon the type of external computer to which the book will be attached. As shown in FIGS. 9 and 10, and in accordance with a presently preferred embodiment of the invention, the memory comprises semi-conductor memory, preferably read only memory, static random access memory, or flash memory and derivatives thereof. For example, electrically erasable read only memory may be employed where it is desired to be able to update the contents of the memory in the book. One or more memory chips are connected together to form a continuous or paged address space, and the chip(s)are connected to a multi pin connector 22 attached to the book to provide access to an address bus, a data bus, and one or more control lines 21 such as a chip select line, read/write enable line and power line, as are required to permit the memory to be accessed at least for reading and preferably also for writing where desired.

The book interface module 48 includes a mating connector 50 and a microprocessor 52 having an onboard or external clock oscillator 54. The address bus 56, data bus 58 and control lines, including specifically the chip select line 60 are connected by way of the connectors 50, 22 to the memory 20 in the book. The microprocessor is programmed by way of firmware stored either in memory internal to the microprocessor, or more preferably a portion of the memory stored in the memory device in the book. In this way, the microprocessor can retrieve information from the memory in the book by way of firmware, that being written at the same time as the information is stored in the memory in the book can be most efficiently designed to retrieve the information. For example, it is preferred that the enhancing information is compressed by storing the decompressing software in the memory in the book, rather than in the book interface, the compression algorithm can be updated as new, and more efficient techniques are developed. The way in which enhancing information is stored is not limited by the external hardware. A cable 62 connects an output of the microprocessor 52, which is preferably a bi-directional serial data stream, to an adapter 66 connected to the external computer. In FIG. 9, the adapter 66 is designed to connect to the serial port of a computer by way of a multi-pin connector 74, and includes one or more line drivers 70 for receiving signals from the book interface 48 and transmitting signals to the book interface over the length of the connecting cable 62. The line drivers 70 are preferably powered by an external power supply 72, or by power derived from the serial port where power is available at such port. A multi pin connector that engages the serial port connector found on the computer may be connected either directly to the computer, or by way of a short cable.

In accordance with the embodiment of the invention shown in FIG. 9, retrieval software running on the computer is adapted to retrieve information from the memory in the book, by way of queries sent along the serial cable 62 to the microprocessor 52 in the book interface 48, which then directly addresses data stored in the chip 20 in the book. Data received from the chip is converted from parallel to serial form in the microprocessor 52 of the book interface, and connected by way of the connecting cable, and the adapter to the computer.

The embodiment of the invention shown in FIG. 10 is identical to the one shown in FIG. 9, except for the actual connection to the user's computer. As shown in FIG. 10, a PCMCIA card 80 is attached to the user's computer by way of a 68 pin connector 82 in conformance with the standards for PCMCIA. The card 80 includes a read only memory 84, in which the software for retrieving data from the book interface is stored. This avoids the need for software to be read into the user's computer, which may, especially where it is a small hand held computer or a personal digital assistant, have limited memory. A universal asynchronous receiver/transmitter (UART) 86 is also connected to the 68 pin connector 82 and power for the UART, the ROM and optionally the microprocessor in the book interface and memory in the book are provided from the PCMCIA interface connector.

While the invention has been described in connection with certain presently preferred embodiments thereof, those skilled in the art will recognize that certain modifications and changes may be made therein without departing from the true spirit and scope of the invention which accordingly is intended to be defined solely by the appended claims.

I claim:

1. A device for determining the location in a publication of printed information of interest to a reader, comprising:

a publication having the printed information therein;

means for storage in a machine readable format of information representative of the printed information and its location within said publication, said means for storage mounted to said publication;

processor means for searching the contents of said means for storage and identifying the location in said publication of the printed information of interest; and, connector means for removably interconnecting said means for storage with said processor means, said connection means mounted to said publication.

2. A device for determining the location in a publication of printed information of interest to a reader, as set forth in claim 1, wherein said publication includes a binding and said means for storage and said connector means are mounted within said binding.

3. A device for determining the location in a publication of printed information of interest to a reader, as set forth in claim 2, wherein said connector means is mounted within said binding at the perimeter thereof.

4. A device for determining the location in a publication of printed information of interest to a reader, as set forth in claim 3, further including interface cable means for electrically connecting said storage means and said processor means and having a first end for engagement with said connector means and a second end for engagement with said processor means, said interface cable means including I/O processor means for interfacing the contents of said storage means with said processor means.

5. A device for determining the location in a publication of printed information of interest to a reader, as set forth in claim 3, wherein said processor means is external to said publication, said device further including interface cable means for electrically connecting said storage means and said processor means and having a first end for engagement with said connector means and a second end for engagement with said processor means, said processor means including input means for reader entry of indicia of the printed information of interest and display means for displaying the location in said publication of the printed information of interest.

6. A device for determining the location in a publication of printed information of interest to a reader, as set forth in claim 3, wherein said processor means is external to said publication and includes means for direct connection to said connector means, input means for reader entry of indicia of the printed information of interest and display means for displaying the location in said publication of the printed information of interest.

7. A device for determining the location in a publication of printed information of interest to a reader, as set forth in claim 1, wherein said processor means is mounted to said publication.

8. A device for determining the location in a publication of printed information of interest to a reader, as set forth in claim 1, wherein said processor means includes means for receiving and storing the contents of a plurality of said means for storage for determination of publications having printed information of interest to the reader and the location thereof.

9. A system for determining printed information in a publication of interest to a reader, comprising: a publication having the printed information therein; means for storage in a machine readable format of information representative of the printed information within said publication, said means for storage mounted to said publication; processor means for searching the contents of said means for storage and identifying the printed information in said publication of interest, said processor means further including display means for presenting said identified printed information in a human readable format; and, connector means for removably interconnecting said means for storage with said processor means, said connection means mounted to said publication.

10. A method for determining the location in a publication of printed information of interest to a reader, comprising the steps of: storing in machine readable format in storage means information representative of the printed information and its location within said publication; mounting said storage means to said publication; mounting connector means to said publication and connecting said connector means with said storage means; removably connecting a processor means to said connector means; and, searching the contents of said storage means with said processor means to identify the location in said publication of the printed information of interest.

11. A method for determining the location in a publication of printed information of interest to a reader, as set forth in claim 10, wherein said publication includes a binding and said step of mounting said storage means to said publication includes the step of mounting said storage means to said binding, and said step of mounting a connector means to said publication includes the step of mounting said connector means to said binding.

12. A method for determining the location in a publication of printed information of interest to a reader, as set forth in claim 11, further including the step of interconnecting said connector means and said processor means with interface cable means, said step of interconnecting including the step of interfacing the contents of said storage means with said processor means.

13. A method for determining the location in a publication of printed information of interest to a reader, as set forth in claim 11, further including the steps of inputting to said processor means indicia of the printed information of interest and displaying the location in said publication of the printed information of interest.

14. A method for determining the location in a publication of printed information of interest to a reader, as set forth in claim 13, wherein said step of removably connecting further includes the step of directly removably connecting said processor means to said storage means.

15. A method for determining the location in a publication of printed information of interest to a reader, as set forth in claim 10, further including the step of mounting said processor means to said publication.

16. A method for determining the location in a publication of printed information of interest to a reader, as set forth in claim 10, further including the step of receiving and storing the contents of a plurality of said storage means, and determining said publications having information of interest to the reader and the location thereof in each said publication.

17. A method for determining in a publication printed information of interest to a reader, comprising the steps of:

storing in machine readable format in storage means information representative of the printed information within said publication;

mounting said storage means in said publication;

removably interconnecting said storage means with processor means;

searching by said processor means the contents of said storage means to identify in said publication the printed information of interest; and, displaying said identified printed information in a human readable format.

18. A method for determining in said publication printed information of interest to a reader, as set forth in claim 17, further including the steps of connecting a connector means to said storage means, mounting said connector means in said publication, and removably interconnecting said storage means with said connector means.

19. Apparatus for enhancing access to printed information comprising:

a book including a plurality of pages containing information in printed form;

a mass storage device attached to the book, the mass storage device containing information for enhancing the printed text information contained in the book;

a connector physically attached to the book and electrically connected to the mass storage device for providing electrical signals to the device for retrieving stored information from the device.

20. The apparatus of claim 19 in which the stored information comprises at least a portion of the text information in machine readable form.

21. The apparatus of claim 19 in which the stored information comprises additional information related to the text information.

22. The apparatus of claim 21 in which the related information comprises indexing information.

23. The apparatus of claim 21 in which the related information comprises visual information related to the text of the book.

24. A book with integral machine readable memory accessible to a heterogeneous plurality of computers by way of a standard interface comprising:

a plurality of pages of printed information;

enhancing information stored in machine readable memory permanently attached to the book;

a connector attached to the book for connecting the machine readable memory and external computing device; and machine operating instructions stored in the machine readable memory for controlling the operation of a computing machine attached to the connector.

25. The book of claim 24 further comprising an interface adapter comprising:

a first connector compatible with the connector on the book;

a microcomputer connected to the first connector;

random access memory connected to the microcomputer for temporarily storing information relating to the operation of the microcomputer; and an industry standard second connector for supplying information from the memory in the book to an external computing machine.

26. The apparatus of claim 25 in which the information stored in the machine readable memory in the book comprises operating system instructions for controlling the operation of the microcomputer in the interface adapter.

27. The apparatus of claim 26 in which the information stored in the machine readable memory comprises type identifying information for identifying the type of information stored in the machine readable memory, such as text information, graphics information, and sound information.

28. The apparatus of claim 27 in which the information stored in the machine readable memory comprises addressing information for identifying the address where in the machine readable memory different elements of the enhancing information are stored, so that the enhancing information can be retrieved non-sequentially.

29. The apparatus of claim 28 in which the machine readable memory in the book comprises address connections, data connections, and control connections, and in which the first connector comprises a multi-pin electrical connector, including address pins, data pins, and control pins.

30. The apparatus of claim 28 in which the industry standard connector comprises a serial connector.

31. The apparatus of claim 25 in which the first connector comprises a wireless connector for electromagnetically coupling the machine readable memory to the interface adapter.

32. The apparatus of claim 25 in which the first connector comprises an optical connector for optically coupling the machine readable memory to the interface adapter.

33. The apparatus of claim 26 in which the operating system instructions in the machine readable memory attached to the book comprises instructions for retrieving data from the external computing device via the second, industry standard connector in the form of requests for information;

locating the information stored in the machine readable memory by using the addressing information; and decompressing the information and providing the decompressed information to the external computing device by way of the industry standard connector.

34. The apparatus of claim 19 in which the stored information comprises hierarchical dictionary information.

35. The apparatus of claim 19 in which the stored information comprises thesaurus information.

36. The apparatus of claim 19 in which the stored information comprises language translations information.

* * * * *